United States Patent
Singh et al.

(10) Patent No.: US 11,899,514 B2
(45) Date of Patent: Feb. 13, 2024

(54) MANAGING POWER CONSUMPTION IN A SOFTWARE BUILD ENVIRONMENT

(71) Applicant: VMware LLC, Palo Alto, CA (US)

(72) Inventors: Shalini Singh, Bangalore (IN); Sairam Veeraswamy, Coimbatore (IN); Adarsh Jagadeeshwaran, Bangalore (IN); Joshua Philip Schnee, Austin, TX (US); Vijayaraghavan Soundararajan, Palo Alto, CA (US); Shiva Ds, Coimbatore (IN); Harsh Hirani, Gwalior (IN); Priya Kalaiselvan, Coimbatore (IN); Shashank Rai, Pune (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/727,828

(22) Filed: Apr. 25, 2022

(65) Prior Publication Data

US 2023/0229219 A1 Jul. 20, 2023

(30) Foreign Application Priority Data

Jan. 20, 2022 (IN) .............................. 202241003408

(51) Int. Cl.
*G06F 1/28* (2006.01)
(52) U.S. Cl.
CPC ....................... *G06F 1/28* (2013.01)

(58) Field of Classification Search
CPC ..................................................... G06F 1/3275
See application file for complete search history.

(56) References Cited

U.S. PATENT DOCUMENTS

| | | | |
|---|---|---|---|
| 7,174,468 B2 * | 2/2007 | Gary ................... | G06F 11/3433 713/340 |
| 9,032,129 B2 * | 5/2015 | Færevaag ............. | G06F 1/3203 713/2 |
| 2011/0154309 A1 * | 6/2011 | Sazegari ............. | G06F 11/3062 719/331 |
| 2014/0244191 A1 * | 8/2014 | Oka ..................... | G01R 21/133 702/61 |

FOREIGN PATENT DOCUMENTS

EP 1494110 A2 * 1/2005 ........... G06F 1/3203

* cited by examiner

*Primary Examiner* — Zahid Choudhury
(74) *Attorney, Agent, or Firm* — Quarles & Brady LLP

(57) ABSTRACT

Described herein are systems, methods, and software to manage power consumption in a software build environment. In one implementation, a monitoring service monitors power consumption information associated with a build environment for one or more software components. The monitoring service further identifies one or more trends associated with the power consumption information based at least on the power consumption information satisfying one or more criteria and generates a summary for display that indicates at least the one or more trends. The monitoring service may also identify and display as part of the summary one or more suggestions to improve power consumption based on the one or more trends.

15 Claims, 5 Drawing Sheets

MANAGING POWER CONSUMPTION IN A SOFTWARE BUILD ENVIRONMENT

RELATED APPLICATION

Benefit is claimed under 35 U.S.C. 119(a)-(d) to Foreign Application Serial No. 202241003408 filed in India entitled "MANAGING POWER CONSUMPTION IN A SOFTWARE BUILD ENVIRONMENT", on Jan. 20, 2022, by VMware, Inc., which is herein incorporated in its entirety by reference for all purposes.

TECHNICAL BACKGROUND

Developers use a software build environment to build application components or artifacts from source code, wherein the build environments may use multiple physical computing systems, virtual machines executing on one or more host computing systems, containers, or some other computing endpoint. The build environment may use local hardware of the developer or may use remote computing system resources in some examples. The builds may be used to provide additional functionality in the software, provide fixes to one or more issues with the software, or provide some other update in association with the software. For example, developers may generate builds of an application to support a new feature desired by the customers of the software.

While software builds are necessary to improve the functionality of a software application, resource usage associated with the builds can be an afterthought for some developers. The resource usage may include physical computing resource usage, including processing system usage, memory system usage, and the like for completing a build, and may further include power consumption associated with the computing resources for the builds. The power consumption associated with inefficiencies in the build process can cause environmental impacts and induce additional costs on the developer's organization.

SUMMARY

The technology described herein manages power consumption in a software build environment. In one implementation, a monitoring system monitors power consumption information associated with a build environment for one or more software components. The monitoring system further identifies one or more trends associated with the power consumption information based at least on the power consumption information satisfying one or more criteria and generates, for display, a summary, wherein the summary indicates at least the one or more trends.

DETAILED DESCRIPTION

Figure 1:
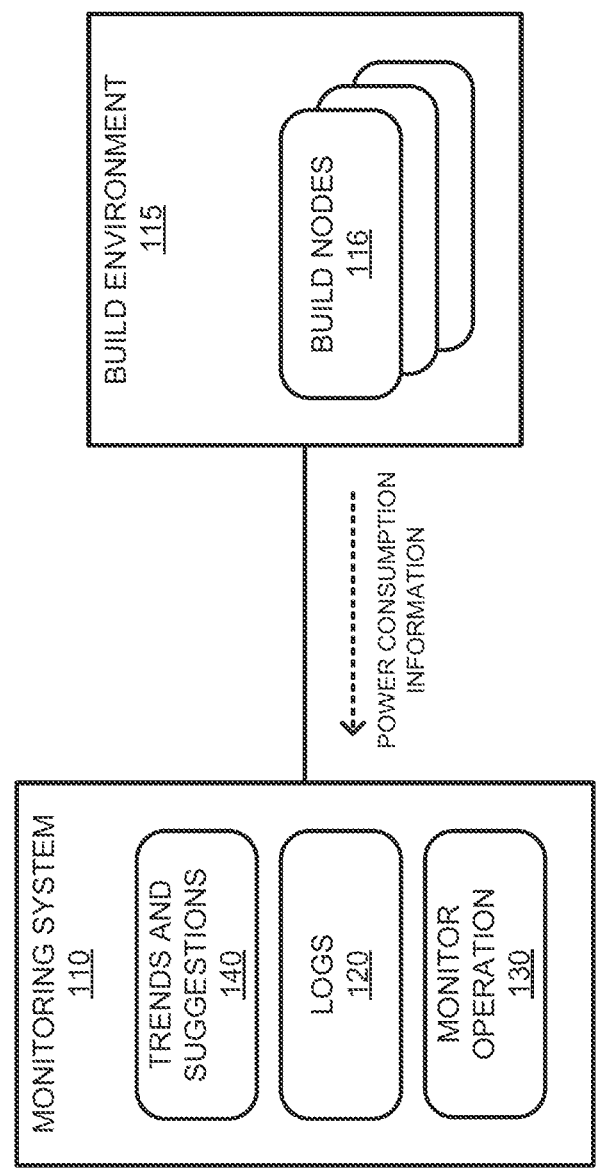
FIG. 1 illustrates a computing environment to manage power consumption associated with a software build environment according to an implementation.

FIG. 1 illustrates a computing environment 100 to manage power consumption associated with a software build environment according to an implementation. Computing environment 100 includes monitoring system 110 and build environment 115. Monitoring system 110 further includes trends and suggestions 140, logs 120, and monitor operation 130. Build environment 115 further includes build nodes 116, wherein build nodes 116 may comprise physical computing systems, virtual machines, containers, or some other virtualized endpoint capable of building an application.

In build environment 115, build nodes 116 are deployed to provide a platform for building executable application components or artifacts from source code. The application components may comprise an operating system, a virtualization platform, a data processing application, or some other set of application components to provide a desired operation. When a build is requested by a developer, the source code is provided to one or more of build nodes 116 and executable components are generated by the one or more build nodes from the source code. During the build, monitor operation 130 on monitoring system 110 may obtain power consumption information associated with the build. The power consumption information may be communicated to monitoring system 110 directly from the physical computing systems supporting the build nodes, from an aggregator system, such as a management service for the build environment, or from some other source. For example, host computing systems that provide a platform for virtual machines that build the application components may report power consumption information to monitoring system 110. The information may be provided periodically, after each build, during down periods for build environment 115, or at some other interval. As the power consumption information is provided, monitor operation 130 may maintain logs 120 or metrics that indicate power consumption associated with build environment 115 as a function of time. Logs 120 may include power consumption for each build, the power consumption used on builds as a function of time periods (e.g., day, week, and the like), power consumption per succeeded build, or some other information, including metrics, regarding the power consumption associated with the various builds. In some implementations, the power consumption information may also include information about the source of the power (i.e., coal, solar, wind, etc.), wherein the information can be based at least in part on the location of the builds, power supplier information associated with the location, or some other source. In at least one example, monitoring system 110 may be configured with information about the power source for build environment and may calculate carbon emissions and other environmental metrics based on the power consumed and the power source.

As the power consumption information is maintained, trends and suggestions 140 are used to identify trends in the power consumption information, suggestions for improving power consumption or cost, or some other power consumption trend or suggestion. In at least one implementation, monitoring system 110 may identify one or more trends in the power consumption information based on the power consumption information satisfying one or more criteria associated with each of the one or more trends. For example, a first trend may be identified for the power consumption information based on the power consumption for the builds exceeding a threshold during a period. Other trends can include an amount of power exceeding a threshold associated with one or more builds, a quantity of builds per period, an amount of power per build, or some other trend. In some implementations, the criteria for identifying a trend can be a value set by a user, however, the criteria may include power consumption information for previous periods, improved or optimized power consumption criteria, or some other criteria. As an example, monitoring system 110 may receive power consumption information associated with builds in build environment 115 and compare the power consumption for the builds with an improved power consumption estimate, wherein the improved power consumption estimate may select build locations (e.g., data centers), build times, and other optimization factors to improve the power consumption for the same builds. This improved power consumption estimate can then be compared to the actual power consumption information to identify a trend, wherein a trend can be identified when the actual power consumption differs from the improved power consumption estimate by a threshold amount or can be identified in some other manner.

Although demonstrated in the previous example as comparing estimated power consumption to actual power consumption, trends may also be identified based on improved environmental impact (e.g., greenhouse gas emission) for builds in comparison to an actual environmental impact, improved power consumption cost associated with the power consumption information compared to actual power consumption cost, or some other comparison of the actual power consumption information to improved power consumption information. For example, a trend can be identified by identifying an improved cost associated with the power consumption information and determining that the improved cost satisfies one or more criteria in relation to the actual cost associated with the power consumption information. This may include the actual cost exceeding a threshold difference with the improved cost for the same builds.

After the trends are identified, monitoring system 110 may generate a summary for an administrator associated with build environment 115. The summary may indicate at least the trends associated with power consumption information and may further include other relevant information associated with the builds. The other information may include suggestions for improving the power consumption, suggestions for improving the cost associated with the power consumption, or some other suggestions. In some implementations, the summary may be stored as a log in logs 120. In other implementations, the summary may be provided as a notification (email, text message, application notification, web notification, or some other notification) to the administrator. In some examples, the decision to cache or distribute the summary may be based on the trends identified. For example, a first trend may permit a summary to be stored in logs 120, while a second trend may require a notification to be provided to an administrator associated with computing environment 100.

In some implementations, monitoring system 110 may provide different summaries to different personnel or users associated with the build environment. Specifically, while a first user or developer may access a first summary for the power consumption information, a second user or developer may access a second summary for the power consumption information. The different summaries may be based on preferences associated with each of the users, a position held by the user (e.g., developer, manager, and the like), or may be based on some other factor. For example, a first developer may be provided with a summary that indicates power consumption information in relation to other developers, wherein the summary may indicate when the power consumption associated with the developer differs by a threshold amount from the other developers, may indicate when the number of builds by a developer exceeds that of one or more other developers, or may provide some other summary information associated with the developer. Similarly, a manager may be provided with different information, wherein the summary may indicate trends associated with multiple developers, an individual developer, or some other information relevant to the manager. In some implementations, depending on the trend identified by monitoring system 110, a summary may be communicated as a notification to one or more users associated with computing environment 100. For example, one or more first trends may trigger a notification to at least one user, whereas one or more second trends may trigger a notification to a second user. In some implementations, the rules for providing the notifications can be included as part of trends and suggestions, wherein specific trends may trigger specific rules for generating summaries and providing the summaries to specific users.

Figure 2:
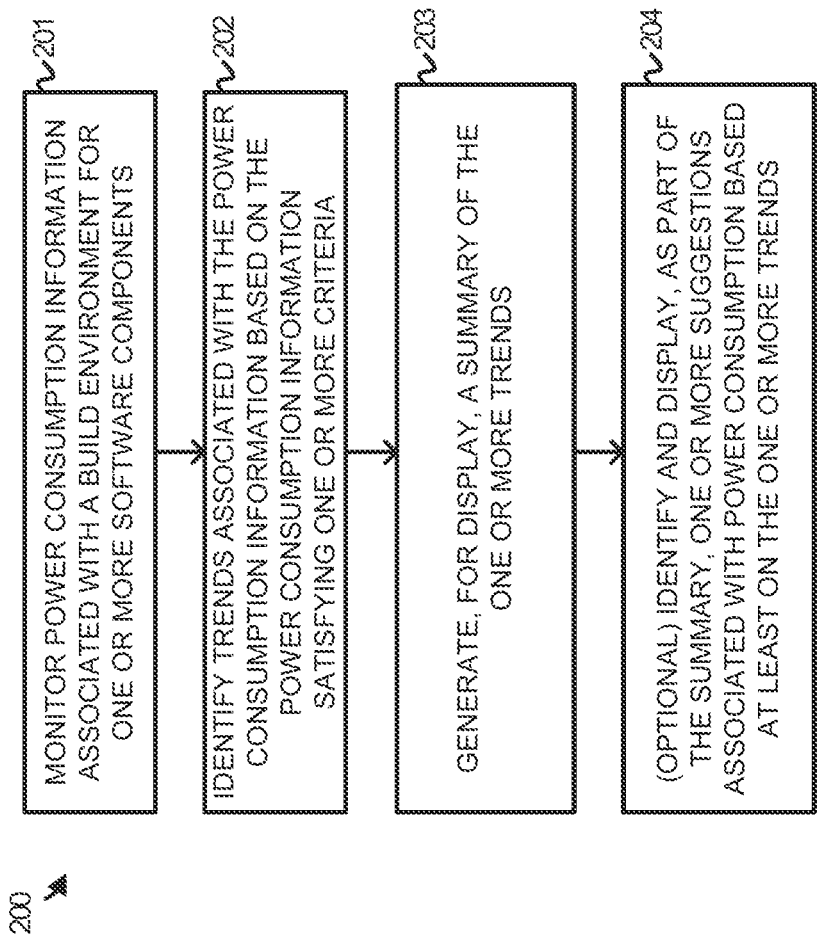
FIG. 2 illustrates a method of managing power consumption associated with a software build environment according to an implementation.

FIG. 2 illustrates a method 200 of managing power consumption associated with a software build environment according to an implementation. The steps of method 200 are referenced parenthetically in the paragraphs that follow with reference to systems and elements of computing environment 100 of FIG. 1.

For method 200, monitoring system 110 monitors (201) power consumption information associated with a build environment for one or more software components. Build environment 115 includes build nodes 116, wherein build nodes 116 may comprise physical or virtual endpoints that process source code to make application components or artifacts that can be executed by a destination computing system. In monitoring the power consumption, monitoring system 110 may obtain the information periodically, after each build of the one or more application components, at downtime periods for build environment 115, or at some other interval. The power consumption information may include the power used on each build, time stamp information associated with each build, the location of nodes for each of the builds, or some other consumption information. In some implementations, monitor operation 130 may store the power consumption information in logs 120 that can be processed as required.

As the consumption information is monitored for the builds of the one or more software components, method 200 further includes identifying (202) one or more trends associated with the power consumption information based at least on the power consumption information satisfying one or more criteria. The trends may be identified at the request of an administrator of the computing environment, at periodic intervals, or at some other interval. The one or more trends may include power consumption for a period exceeding a threshold, a quantity of builds in a period exceeding a threshold, a quantity of failed builds for a period exceeding a threshold, the power consumption nearing one or more total power consumption goals for a period (e.g., total power consumption for a year), the emissions determined from the power consumption and power source (coal, wind, solar, and the like) satisfying a threshold, or some other trend. For example, monitoring system 110 may determine that the number of failed builds from build environment 115 exceeds a threshold over a defined period. Once the failed builds exceed the threshold, monitoring system 110 may identify the failed builds as a trend.

In some implementations, the trends may be identified based on the power consumption information associated with a first period differing from the power consumption information of a second period by a threshold amount. For example, monitoring system 110 may compare the power consumption during different periods and identify a trend based on the power consumptions differing by a threshold amount. Similar operations may also include comparing the cost of power consumption between periods, comparing the number of failed builds, or identifying some other trend based on a comparison of the power consumption information between periods.

In some examples, the trends may be identified based on comparing the actual power consumption information to an estimated optimization or improvement of the power consumption during the same period. The estimated improvement to the power consumption may consider the location of the builds, the time of the builds, or some other factor. The estimated improvement may be used to improve cost, overall power consumption, environmental impact (i.e., carbon emissions), or some combination thereof, and may be defined by a user in some implementations. As an example, the estimated optimization may estimate the lowest cost for power consumption associated with a quantity of builds, wherein the optimization may change the location of the builds, the time of the builds, or some other factor in association with the lowest power consumption cost. The improved cost associated with the builds can then be compared to the actual cost of the builds derived from the power consumption information to determine whether a trend or tend of interest is identified. The trend can occur when the actual cost exceeds the improved cost by a threshold amount or can occur based on some other relationship between the actual cost and the improved estimated cost. Although demonstrated using cost, monitoring system 110 may identify improved environmental impacts or carbon consumption for the builds, improved power consumption for the number of builds, or some other optimization associated with the power consumption information. The improved values can then be compared to the actual power consumption information to determine whether a trend exists.

After identifying the one or more trends, method 200 further includes generating (203), for display, a summary of the one or more trends. In some implementations, monitoring system 110 may use trends and suggestions 140 to identify trends in the power consumption information provided from build environment 115. The power consumption information may be compared to criteria associated with various possible trends. If the power consumption information satisfies the criteria for a trend, then the trend is identified as a trend for the summary (e.g., identified as a trend of interest). If the power consumption information does not satisfy the criteria for the trend, then the trend is not identified for the summary. The criteria may be one or more set values, values identified from one or more previous time periods, optimized or improved values for the same period, or some other criteria.

In some implementations, the trends may be promoted in the summary over other statistical data for the power consumption information. For example, if the power consumption for one or more builds exceeded a threshold for a trend, then the power consumption information associated with the one or more builds may be promoted over other statistics in the summary. Thus, the power consumption of other builds may also be displayed but may not be promoted with the power consumption information associated with the one or more builds. The promotion may include increasing the size of the power consumption information for the one or more builds over other power consumption information, providing the power consumption information for the one or more builds in a different format over other power consumption information, or providing the power consumption information for the one or more builds in some other manner to promote the information over other power consumption information.

In some implementations, in addition to identifying the one or more trends, method 200 further includes identifying (204) one or more suggestions associated with power consumption based at least on the one or more trends and displaying the suggestions as part of the summary. In some examples, when trends are identified, monitoring system 110 may determine optimizations that can be made in association with the trends, wherein the optimizations may include changing locations (e.g., datacenters, computing systems, etc.) with the builds, time-shifting the builds, changing the source code itself, preserving at least a portion of the source code between builds, or some other optimization associated with the build. In some implementations, monitoring system 110 may generate improved or optimized estimates for the build environment for the same number of builds, wherein the improved estimates may optimize based on cost, environmental impact, or some other factor. The improved estimates may optimize based on location of the builds, the time of the builds, and the like. The improved estimate can then be compared to the actual power consumption information and displayed as part of the summary. As an example, a user may indicate a desire to improve the build environment to limit environmental effects from the build process. Monitoring system 110 may select locations, build times, or other optimization factors to limit the environmental harm from the builds. Suggestions can then be made based on the differences between the optimizations and the actual power consumption information. For example, the optimization may use a first location for the builds in place of a second location that was used during the actual builds. The first location can then be provided as a suggestion for one or more future builds to improve the environmental impact associated with the build process. The suggestion may also indicate the improvement (e.g., greenhouse gas emission or some other environmental measurement) in relation to the previous builds. Thus, the summary may indicate the environmental impact savings of using the first location for the builds in place of the second location.

Figure 3:
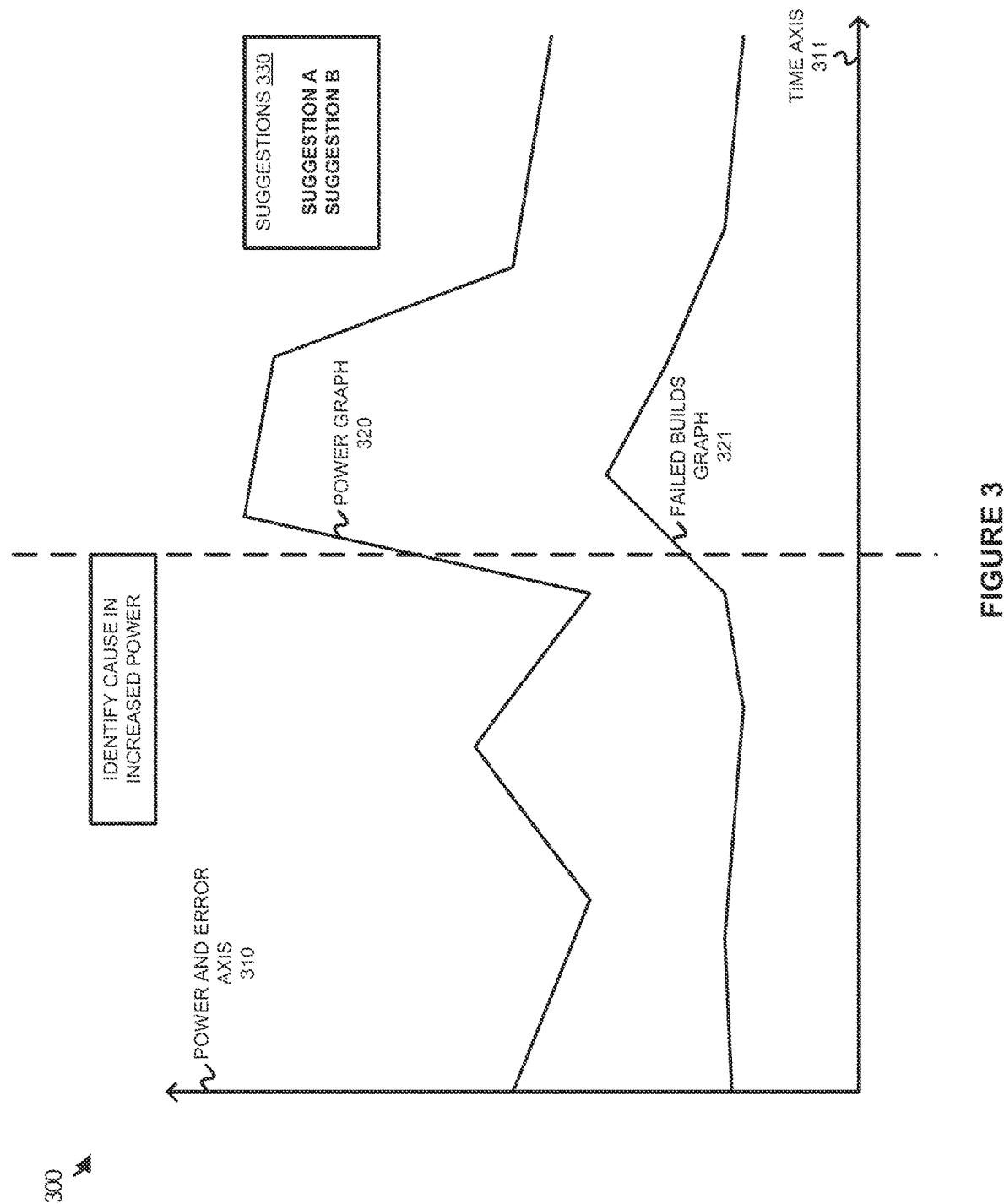
FIG. 3 illustrates an example summary for power consumption associated with a software build environment according to an implementation.

FIG. 3 illustrates an example summary 300 for power consumption associated with a software build environment according to an implementation. Example summary 300 includes power graph 320, failed builds graph 321, power and error axis 310, and time axis 311. Example summary 300 further includes suggestions 330.

As described herein, a monitoring system may monitor power consumption information associated with a build environment for one or more software components, wherein the build environment may comprise physical computing systems, virtual machines, containers, or other build endpoints. As the power consumption information is provided from the build environment, the monitoring system may identify one or more trends associated with the power consumption information. In some implementations, the power consumption information can be compared to criteria associated with possible trends. When the power consumption information satisfies the criteria associated with a possible trend, then the trend will be identified. However, when the power consumption information does not satisfy the criteria associated with a possible trend, then the trend will not be identified. Trends that can be identified by the management service may include power consumption exceeding a threshold over a period, failed builds exceeding a threshold over a period, power consumption per build exceeding a threshold, or some other trend from the power consumption information.

Here, the monitoring service identifies trends that correspond to power consumption as a function of time and failed builds as a function of time. Once the trends are identified, example summary 300 can be generated that displays the trends to a user or administrator associated with the build environment. In example summary 300, power graph 320 and failed builds graph 321 are overlayed on the same axis to demonstrate possible causes for the increase in power consumption. Specifically, the summary can generate a notification that indicates that the power consumption increased as the failed number of builds increased. Although demonstrated as overlaying the identified trends on the same graph, a summary may indicate the trends in different graphs, tables, or some other visual representation. In some examples, the summary may further indicate additional power consumption information that is not identified as a trend. The summary may promote the trends over the additional power consumption information by using different sizes for the trends, different colors, focused locations in the summary, or promoting the trends in some other manner.

In example summary 300, the monitoring system further identifies suggestions 330 associated with the power consumption based at least on the identified trends. The suggestions can be used to improve the power consumption, improve costs associated with power consumption, improve environmental impact, or provide some other suggestion based on the one or more identified trends. As an example, a trend may indicate that the largest power consumption occurs during specific intervals. In response to identifying the trend, the monitoring service may identify the cost associated with building the software in different locations in the build environment. For example, the cost for doing the builds at a first location may correspond to a first cost, while the builds at a second location may correspond to a second cost. The suggestions may provide an indication to direct future builds to the location associated with the lowest cost and may display as part of the summary the differences in costs between the locations for the same builds.

In another example, the suggestions can be used to indicate a location with the highest use of renewable or clean energy. For example, a first location may receive solar power, while another location is powered using natural gas. A suggestion can be used to prefer the first location over the second location. In addition to suggesting locations for the builds, other suggestions may include time-shifting build times from a first time to a second time. The time shift may be used to reduce the cost associated with power consumption, may provide reduced load on the computing systems providing the build environment, or may provide some other benefit in association with power consumption. For example, the monitoring system may identify a trend that the power consumption for builds is frequently higher during a more costly period. Accordingly, the monitoring system may provide suggestions that can indicate time periods that are cheaper or reduce the cost associated with building the one or more software components.

In some examples, the suggestions may correspond to the build environment itself, wherein the suggestions can relate to hardware or software issues identified in the environment. For example, the monitoring system may determine that builds in a first location fail more frequently than a second location. The monitoring system may run diagnostic processes or monitor the feedback from the failed builds to identify possible overconsumption issues related the physical resources, networking issues, operating system logs, or some other information to determine a hardware or software cause in association with the builds. The suggestions may be used to provide possible solutions to the hardware or software issue, potential location changes to solve the hardware or software issue, or some other suggestion.

In another implementation, the builds may be monitored for different developers (e.g., users of the build environment) to identify developers who satisfy one or more criteria related to power consumption. The one or more criteria may include a power consumption threshold, a quantity of total builds by the user, a quantity of total failed builds by the user, or some other criteria. As an example, a trend may be identified for a user that initiates a quantity of failed builds that satisfy a threshold value. Once the trend is identified, a summary can be provided to the developer, the manager for the developer, or some other party indicating the trend associated with the failed builds. The summary may further indicate one or more suggestions that could be used to decrease the number of failed builds and the power consumption that coincides with the failed builds. The suggestions may be associated with the trends, wherein the suggestions may identify portions of the code that frequently fail, build frequencies associated with other developers, portions of the code that could be preserved between builds, or some other suggestion in association with the trend. The suggestion may also indicate one or more other developers that are encountering a higher build success rate and provide contact information (name, email, and the like) for the developers, may indicate to the developer to be more careful prior to initiating a build, or provide some other suggestion.

Figure 4:
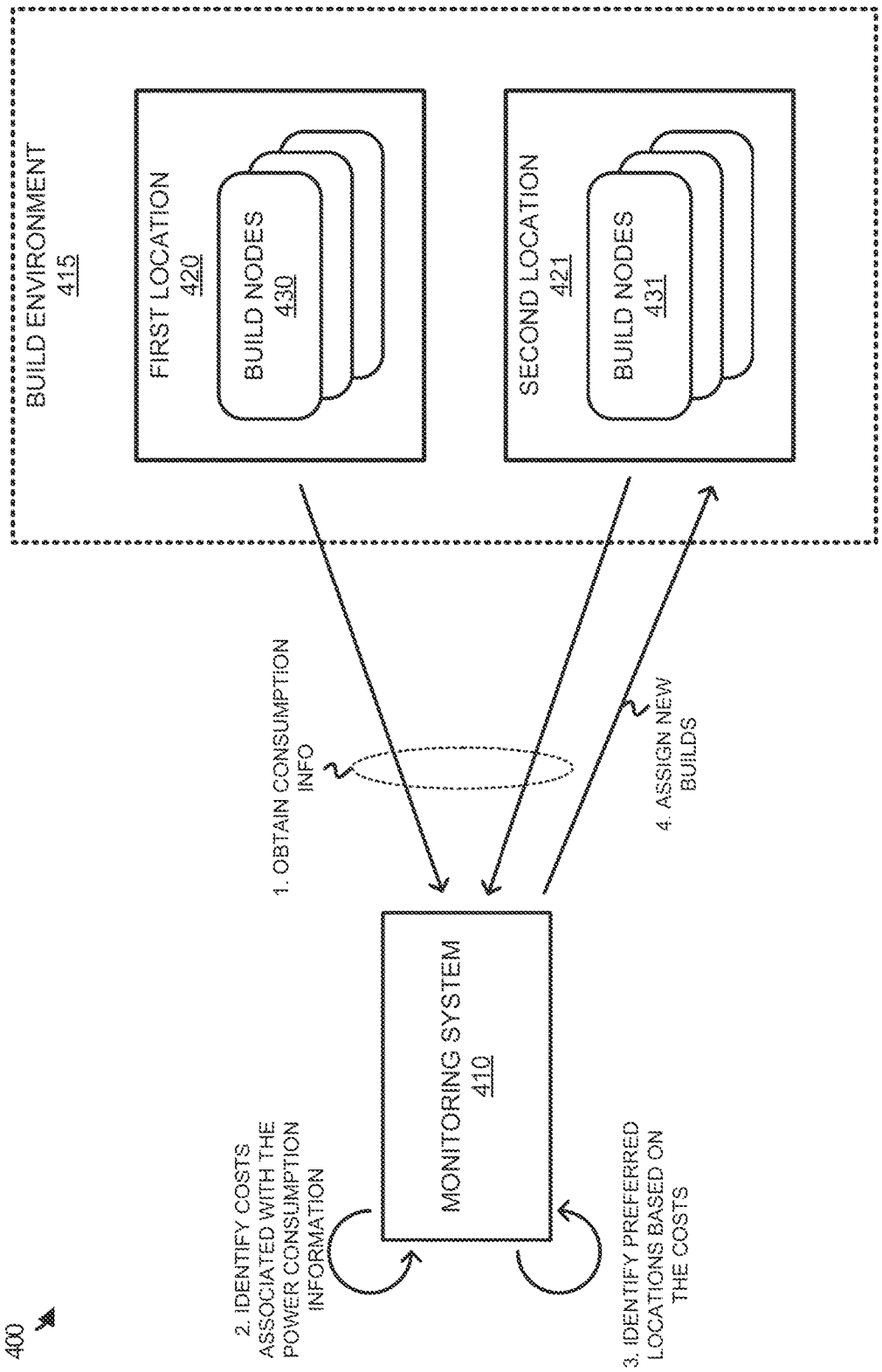
FIG. 4 illustrates an operational scenario of managing power consumption in a software build environment according to an implementation.

FIG. 4 illustrates an operational scenario 400 of managing power consumption in a software build environment according to an implementation. Operational scenario 400 includes monitoring system 410 and build environment 415, wherein build environment 415 includes first location 420 with build nodes 430 and second location 421 with build nodes 431.

In operational scenario 400, monitoring system 410 obtains power consumption information from locations 420-421 at step 1, wherein the power consumption information may include the total power consumption for each of the builds, the power consumption as a function of time, or some other power consumption information. As the power consumption information is obtained, monitoring system 410 identifies costs associated with the power consumption information at step 2. In some implementations, monitoring system 410 may identify trends, wherein the trends may comprise power consumption exceeding a threshold for a period, a quantity of successful or failed builds exceeding a threshold, trending times for when builds occur (e.g., average number of builds or power usage per day), or some other trend.

In some examples, monitoring system 410 may identify costs associated with generating the builds. For example, monitoring system 410 may identify costs associated with building the one or more software components based on locations associated with the builds, times of the builds, and the like. Monitoring system 410 may further identify costs associated with other locations if the builds were performed at those locations in place of the current location. For example, first location 420 may build the software components for an application. Monitoring system 410 may identify the cost associated with building the application at first location 420 based on costs associated with the power provider to first location 420 and the times of the builds at first location 420. Additionally, monitoring system 410 may also estimate the costs at second location 421 using the costs associated with the power provider to second location 421 and the times of the builds at the first location. Based on the costs, monitoring system 410 may identify a preferred location or locations for the builds at step 3. For example, during a first period, monitoring system 410 may determine that it is preferential to perform the builds at first location 420, while during a second period it may be preferential to perform the builds at second location 421. The preferential locations can then be provided as a suggestion to a user or administrator as part of a summary of the power consumption associated with the builds. Once provided in the summary, the administrator or user may change a configuration such that the builds are directed to one of first location 420 or second location 421 based the suggestions from monitoring system 410.

In some implementations, rather than waiting for user input to a summary, monitoring system 410 may automatically migrate or direct builds to either first location 420 or second location 421. For example, monitoring system 410 may monitor trends on when builds are performed based on the power consumption information, determine costs associated with building the application at locations 420-421, and direct or assign new builds to locations based on the costs associated with the builds.

Although demonstrated in the previous example as selecting a location as a suggestion based on the trends, monitoring system 410 may make other suggestions based on the power consumption information provided from build environment 415. The other suggestions may include the times for generating the builds, changes in the way that the code is built (e.g., preserving portions of the components or artifacts that are unchanged between builds), or providing some other suggestion. As an example, monitoring system 410 may generate a suggestion that indicates one or more portions of the source code that can be preserved between builds, saving the power consumption resources associated with building the same software components.

In some implementations, the suggestions that are generated from monitoring system may correspond to conserving power or using different power sources for build environment 415. For example, first location 420 may be power using a first power source that is less environmentally friendly than the power source for second location 421. Monitoring system 410 may identify the power consumption information at each of the locations and determine the environmental repercussions associated with the builds at each of the locations and recommend different locations or build times that could improve the environmental impact.

Figure 5:
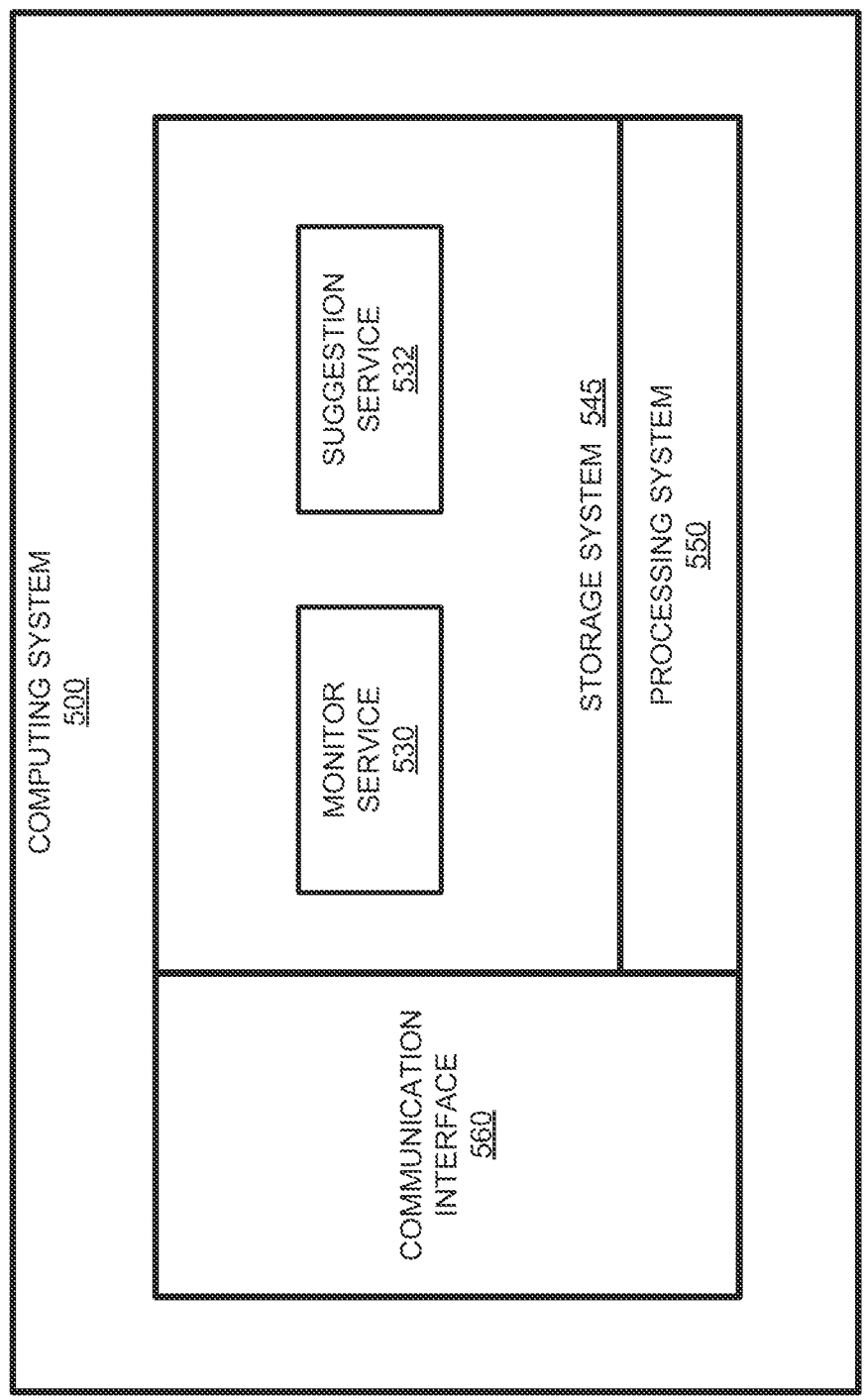
FIG. 5 illustrates a computing system to manage power consumption for a software build environment according to an implementation.

FIG. 5 illustrates a computing system 500 to manage power consumption for a software build environment according to an implementation. Computing system 500 is representative of any computing system or systems with which the various operational architectures, processes, scenarios, and sequences disclosed herein for a management system can be implemented. Computing system 500 is an example of monitoring system 110 of FIG. 1, although other examples may exist. Computing system 500 includes storage system 545, processing system 550, and communication interface 560. Processing system 550 is operatively linked to communication interface 560 and storage system 545. Communication interface 560 may be communicatively linked to storage system 545 in some implementations. Computing system 500 may further include other components such as a battery and enclosure that are not shown for clarity.

Communication interface 560 comprises components that communicate over communication links, such as network cards, ports, radio frequency (RF), processing circuitry and software, or some other communication devices. Communication interface 560 may be configured to communicate over metallic, wireless, or optical links. Communication interface 560 may be configured to use Time Division Multiplex (TDM), Internet Protocol (IP), Ethernet, optical networking, wireless protocols, communication signaling, or some other communication format—including combinations thereof. Communication interface 560 may be configured to communicate with computing systems associated with a build environment to obtain power consumption information associated with the software builds in the build environment. The computing systems may comprise host computing systems or may comprise management computing systems for the host computing systems, wherein the management computing system may collect the information from the various hosts and provide the information to the computing system 500.

Processing system 550 comprises microprocessor and other circuitry that retrieves and executes operating software from storage system 545. Storage system 545 may include volatile and nonvolatile, removable, and non-removable media implemented in any method or technology for storage of information, such as computer readable instructions, data structures, program modules, or other data. Storage system 545 may be implemented as a single storage device but may also be implemented across multiple storage devices or sub-systems. Storage system 545 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 550 is typically mounted on a circuit board that may also hold the storage system. The operating software of storage system 545 comprises computer programs, firmware, or some other form of machine-readable program instructions. The operating software of storage system 545 comprises monitor service 530 and suggestion service 532. The operating software on storage system 545 may further include an operating system, utilities, drivers, network interfaces, applications, or some other type of software. When read and executed by processing system 550 the operating software on storage system 545 directs computing system 500 to operate as described herein. In at least one example, the operating software can provide at least operation 200 described above in FIG. 2.

In at least one implementation, monitor service 530 directs processing system 550 to monitor power consumption information associated with a build environment for one or more software components. The power consumption information may be provided by computing systems in the build environment at periodic intervals, following each build, at the request of computing system 500, or at some other interval. In some implementations, the build environment may comprise host computing systems that provide a platform for virtual machines, containers, or some other virtual endpoint that build the one or more software components from source code. The one or more software components can comprise an application, an operating system, or some other software components.

As the power consumption information is monitored, monitor service 530 directs processing system 550 to identify one or more trends associated with the power consumption information based at least on the power consumption information satisfying one or more criteria. The one or more trends may correspond to a quantity of builds exceeding a threshold for a period, power consumption for one or more builds exceeding a threshold, power consumption over a period exceeding a threshold, a quantity of failed builds for a period exceeding a threshold, or some other trend. Once the one or more trends are identified, monitor service 530 directs processing system 550 to generate a summary that indicates at least the one or more trends. In some implementations, the summary can be generated automatically and distributed as a notification to one or more users associated with the build environment. In other implementations, the summary can be generated in response to a request from a user.

In some implementations, the summary may indicate other data associated with the power consumption information but may promote the identified one or more trends over the other data. The promotion may include increasing the size of the trends, providing the trends in a different color, placing the trends in a higher priority location (e.g., top) of the summary, or promoting the trends in some other manner.

In some examples, in addition to identifying one or more trends in the power consumption information, suggestion service 532 may direct processing system 550 to determine suggestions in association with the power consumption, wherein the suggestions may be determined at least in part on the identified trends. The suggestions may be used to improve power consumption, improve cost in association with the power consumption, or a combination of both. As an example, a trend identified my monitor service 530 may indicate that the power consumption for builds over a first period exceeded that of a second period. Once the trend is identified, suggestion service 532 may direct processing system 550 to identify differences between the first period and the second period and determine one or more suggestions to improve the power consumption. The suggestions may include changing the location of the builds from a first location to a second location, changing the time that builds are implemented, or changing some other operation in association with the builds.

In some implementations, monitor service 530 may identify trends based on a comparison to set values, a comparison of the power consumption information to previous periods, or a comparison to some other criteria. Once a trend is identified, suggestion service 532 can use the trends to identify one or more suggestions to improve the power consumption or costs associated with the power consumption. In some examples, suggestion service 532 may simulate the costs or power consumption associated with the builds by changing locations for the builds, time-shifting the time of the builds, or providing some other simulation. The simulations may then be used to identify to provide suggestions to improve the costs associated with power consumption, power consumption itself, or the environmental impact of the builds in the build environment.

In some examples, a user may indicate preferences indicating the power consumption improvements that are most relevant to the user or the organization. Specifically, the user may indicate that the environmental impact is most important to the user. Accordingly, when identifying the suggestions, suggestion service 532 can direct processing system 550 to identify suggestions that improve the environmental impact of the builds in the build environment. These suggestions can include moving the builds to computing systems supplied by renewable energy, time-shifting the builds to times with a lower environmental impact, or some other suggestion in association with the user preferences. For example, a trend identified by monitor service 530 may indicate that builds are frequently being completed at a first location, while suggestion service 532 may determine that a second location may provide a decreased environmental impact (e.g., solar power in place of gas power). Accordingly, a suggestion may be made as part of the summary that indicates the second location would provide a lower environmental impact. The suggestion may further provide information about the differences between the suggested location of the builds and the current location, wherein the information may include greenhouse gas emission differences, cost differences, build time differences, or some other information related to power consumption. Once suggestions are provided to an administrator, the summary may also permit the user to provide input indicating one or more accepted suggestions, permitting computing system 500 to implement the requested changes. These changes may include directing build requests to the appropriate location, delaying or scheduling builds to a desired time, or providing some other operation in association with the suggestions.

In some implementations, in addition to or in place of generating a summary, computing system 500 may automatically implement one or more changes in association with the power consumption. In some examples, the automatic changes may be based on preferences provided by a user, wherein the user may indicate cost preferences, power consumption preferences, environmental impact preferences, and the like. As trends are identified in the power consumption information, computing system 500 may identify optimizations in association with the trends and automatically configure the build environment to support the optimizations. The optimizations may include selecting locations for the builds, build times for the builds, or some other optimization.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
monitoring power consumption information during builds of one or more software components in a build environment, wherein the build environment builds executable code from source code for the one or more software components;
identifying one or more trends associated with the power consumption information based at least on the power consumption information satisfying one or more criteria;
identifying one or more suggestions associated with the power consumption based at least on the one or more trends, wherein the one or more suggestions comprise at least a time-shift suggestion to move one or more future builds of the one or more software components from a first period to a second period; and generating, for display, a summary, wherein the summary indicates at least the one or more trends and the one or more suggestions associated with the power consumption.

2. The method of claim 1, wherein the build environment comprises a plurality of host computing systems for a plurality of virtualized endpoints.

3. The method of claim 1, wherein the one or more suggestions comprise a location change to move one or more future builds of the one or more software components from a first location to a second location.

4. The method of claim 1, wherein identifying the one or more trends associated with the power consumption information based at least on the power consumption information satisfying one or more criteria comprises:
identifying an estimated improved cost associated with the power consumption information;
identifying a trend of the one or more trends based on an actual cost associated with the power consumption information satisfying one or more criteria in relation to the estimated improved cost.

5. The method of claim 1, wherein identifying the one or more trends associated with the power consumption information based at least on the power consumption information satisfying one or more criteria comprises:
identifying that the power consumption information associated with at least one build of the one or more builds exceeds a threshold.

6. The method of claim 1, wherein the power consumption information comprises at least a total power consumption used per build in a plurality of builds for the one or more software components.

7. The method of claim 1, wherein a trend of the one or more trends comprises a quantity of failed builds of the one or more software components in relation to a quantity of successful builds of the one or more software components.

8. A computing apparatus comprising:
a storage system;
a processing system operatively coupled to the storage system; and
program instructions stored on the storage system that, when executed by the processing system, direct the computing apparatus to:
monitor power consumption information during builds of one or more software components in a build environment, wherein the build environment builds executable code from source code for the one or more software components;
identify one or more trends associated with the power consumption information based at least on the power consumption information satisfying one or more criteria;
identify one or more suggestions associated with the power consumption based at least on the one or more trends, wherein the one or more suggestions comprise at least a time-shift suggestion to move one or more future builds of the one or more software components from a first period to a second period or a location suggestion to move one or more future builds of the one or more software components from a first location to a second location; and
generate, for display, a summary, wherein the summary indicates at least the one or more trends and the one or more suggestions associated with the power consumption.

9. The computing apparatus of claim 8, wherein the build environment comprises a plurality of host computing systems for a plurality of virtualized endpoints.

10. The computing apparatus of claim 8, wherein identifying the one or more trends associated with the power consumption information based at least on the power consumption information satisfying one or more criteria comprises: identifying an estimated improved cost associated with the power consumption information; identifying a trend of the one or more trends based on an actual cost associated with the power consumption information satisfying one or more criteria in relation to the estimated improved cost.

11. The computing apparatus of claim 8, wherein identifying the one or more trends associated with the power consumption information based at least on the power consumption information satisfying one or more criteria comprises:
identifying that the power consumption information associated with at least one build of the one or more builds exceeds a threshold.

12. The computing apparatus of claim 8, wherein the power consumption information comprises at least a total power consumption used per build in a plurality of builds for the one or more software components.

13. The computing apparatus of claim 8, wherein a trend of the one or more trends comprises a quantity of failed builds of the one or more software components in relation to a quantity of successful builds of the one or more software components.

14. A system comprising:
one or more computing systems that provide a build environment for one or more software components;
a monitoring computing system configured to:
obtain power consumption information associated with builds of the one or more software components, wherein each of the builds attempt to generate executable code from source code for the one or more software components;
identify one or more trends associated with the power consumption information based at least on the power consumption information satisfying one or more criteria;
identify one or more suggestions associated with power consumption based at least on the one or more trends, wherein the one or more suggestions comprise at least a time-shift suggestion to move one or more future builds of the one or more software components from a first period to a second period or a location suggestion to move one or more future builds of the one or more software components from a first location to a second location; and
generate, for display, a summary, wherein the summary indicates at least the one or more trends and the one or more suggestions.

15. The system of claim 14, wherein identifying the one or more trends associated with the power consumption information based at least on the power consumption information satisfying one or more criteria comprises:
identifying an estimated improved cost associated with the power consumption information;
identifying a trend of the one or more trends based on an actual cost associated with the power consumption information satisfying one or more criteria in relation to the estimated improved cost.

\* \* \* \* \*